United States Patent
Mansfield (10) Patent No.: US 8,332,626 B2
(45) Date of Patent: Dec. 11, 2012

(54) METHOD AND APPARATUS FOR AUTHENTICATION TOKEN-BASED SERVICE REDIRECTION

(75) Inventor: Jason Michael Mansfield, San Diego, CA (US)

(73) Assignee: Ntrepid Corporation, Herndon, VA (US)

( * ) Notice: Subject to any disclaimer, the term of this patent is extended or adjusted under 35 U.S.C. 154(b) by 335 days.

(21) Appl. No.: 12/761,046

(22) Filed: Apr. 15, 2010

(65) Prior Publication Data

US 2011/0258453 A1    Oct. 20, 2011

(51) Int. Cl.
*H04L 29/06* (2006.01)
(52) U.S. Cl. ........................................ 713/153
(58) Field of Classification Search .................. 713/153
See application file for complete search history.

(56) References Cited

U.S. PATENT DOCUMENTS

| | | | |
|---|---|---|---|
| 2003/0061509 A1* | 3/2003 | Fisher | 713/201 |
| 2005/0076246 A1* | 4/2005 | Singhal | 713/201 |
| 2007/0136794 A1* | 6/2007 | Chin et al. | 726/5 |
| 2008/0271146 A1* | 10/2008 | Rooney et al. | 726/23 |
| 2009/0125387 A1* | 5/2009 | Mak et al. | 705/14 |
| 2009/0198618 A1* | 8/2009 | Chan et al. | 705/66 |
| 2010/0138905 A1* | 6/2010 | Kass | 726/7 |

* cited by examiner

*Primary Examiner* — Kambiz Zand
*Assistant Examiner* — Teshome Hailu
(74) *Attorney, Agent, or Firm* — Squire Sanders (US) LLP (57) ABSTRACT

A method, apparatus, and computer readable medium is provided. According to an embodiment, a method includes, receiving a message from a client. The method further includes, forwarding the message to a first service when the message includes an authentication token, where the authentication token indicates that the client can access the first service. The method further includes, forwarding the message to a second service when the message excludes the authentication token. The receiving the message from the client and the forwarding the message to the first service occur over a confidential channel.

21 Claims, 8 Drawing Sheets

METHOD AND APPARATUS FOR AUTHENTICATION TOKEN-BASED SERVICE REDIRECTION

BACKGROUND

1. Field

Embodiments of the present invention generally relate to computer systems. More specifically, certain embodiments of the present invention relate to computer systems which utilize a sequential, stream-oriented protocol.

2. Description of the Related Art

Cryptographic protocols, such as Secured Sockets Layer (SSL)/Transport Layer Security (TLS), Internet Protocol Security (IPSec), and OpenVPN, can provide security for communications over networks such as the Internet. One type of security that a cryptographic protocol can provide is client authentication. For example, a client may wish to access a server over a sequential, stream-oriented protocol. However, the server may only allow legitimate clients to access services that reside on the server, and thus, can require a mechanism for authenticating clients. The cryptographic protocol may allow a server to request authentication of a client. In response to the request, if the client is a legitimate client, the client can present a certificate via the cryptographic protocol, which indicates that the client is a legitimate client. The server then can authenticate the certificate, and allow the client access to the server and the services that reside on the server. The cryptographic protocol may also allow a client to volunteer a certificate to the server without the server requesting that the client provide a certificate.

However, in cryptographic protocols, client authentication is an all-or-nothing endeavor. Either the server authenticates the client and allows the client to access the server and all the services of the server, or the server fails to authenticate the client and the client is denied access to the server and all the services of the server. Currently, cryptographic protocols do not provide the capability of forwarding an unauthenticated client away from a service of the server that is protected to another service of the server that is accessible to all clients.

SUMMARY

According to an embodiment of the invention, a method includes, receiving a message from a client. The method further includes, forwarding the message to a first service when the message includes an authentication token, where the authentication token indicates that the client can access the first service. The method further includes, forwarding the message to a second service when the message excludes the authentication token. The receiving of the message from the client, and the forwarding of the message to the first service occur over a confidential channel.

According to another embodiment, an apparatus includes a memory configured to store instructions and a processor configured to execute the instructions stored on the memory. The processor is further configured, when executing the instructions stored on the memory, to receive a message from a client. The processor is further configured, when executing the instructions stored on the memory, to, forward the message to a first service when the message includes an authentication token, where the authentication token indicates that the client can access the first service. The processor is further configured, when executing the instructions stored on the memory, to, forward the message to a second service when the message excludes the authentication token. The processor is further configured, when executing the instructions stored on the memory, to receive the message from the client, and to forward the message to the first service over a confidential channel.

According to another embodiment, a computer readable medium having a computer program stored thereon that, when executed by a processor, causes the processor to implement a method. The method includes receiving a message from a client. The method further includes, forwarding the message to a first service when the message includes an authentication token, where the authentication token indicates that the client can access the first service. The method further includes, forwarding the message to a second service when the message excludes the authentication token. The receiving of the message from the client, and the forwarding of the message to the first service occur over a confidential channel.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

A "service" or "web service," as understood by one of ordinary skill in the art, is a software application designed to support interoperable machine-to-machine interaction over a network. A service can have an interface described in a machine-processable format. A system can interact with a service by sending messages over a sequential, stream-oriented protocol such as Hypertext Transfer Protocol (HTTP). Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

According to an embodiment of the invention, services can be divided into two classes. The first class of services is a class of services that are made available only to authenticated clients. The second class of services is a class of services that are made available to all clients, whether they are authenticated or not. Furthermore, according to an embodiment, an application router can authenticate a client based on an authentication token, and can route the client to either the first class of services or the second class of services, depending on whether the application router is able to authenticate the client. In the embodiment, an exchange between the application router and the client can occur over a confidential channel. Because of the confidential channel, other clients cannot become aware of the content of the exchange between the application router and the client.

Figure 1:
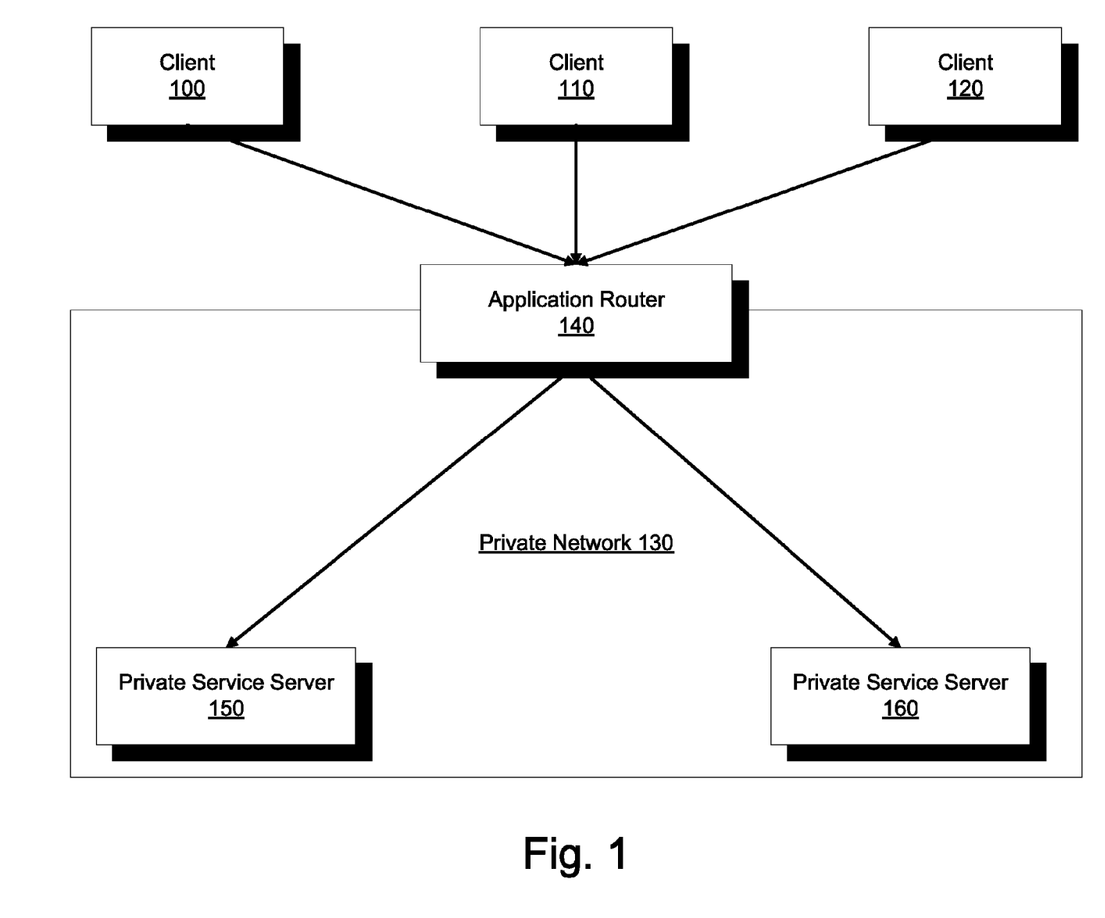
FIG. 1 illustrates an example embodiment of a system according to the present invention.

FIG. 1 illustrates an example embodiment of a system according to the present invention. The system includes clients 100, 110, and 120, private network 130, application router 140, and private service servers 150 and 160. As one of ordinary skill in the art would readily appreciate, the number of clients and number of private service servers in the system is not limited to the number illustrated in FIG. 1, and the number of clients and private service servers illustrated in FIG. 1 is merely an example to better illustrate an embodiment of the invention. Furthermore, one of ordinary skill in the art would readily appreciate that the system of FIG. 1 may be capable of having other components, and that other components not relevant to the illustrated embodiment of the invention are not illustrated in FIG. 1.

A client, such as clients 100, 110, and 120, can be any computer system or software application that accesses a service on a remote computer system. For example, in FIG. 1, a client can be a desktop computer, laptop computer, personal computer, user terminal, personal digital assistant, portable computer, tablet computer, or any other computer system that is known in the art, that resides outside of private network 130. As another example, in FIG. 1, clients 100, 110, and 120 each can be a web browser, a media player, an executive dashboard, an e-mail client, a word processor application, or any other software application that is known in the art, that originates outside of private network 130.

Private network 130 is a computer network that is not directly connected to the Internet. Thus, Internet Protocol (IP) packets or messages directed towards private network 130 must pass through application router 140. Likewise, IP packets or messages originating from private network 130 and directed towards the Internet must also pass through application router 140. Private network 130 can be a local access network (LAN), a wide access network (WAN), a personal area network (PAN), a home area network (HAN), a campus area network (CAN), a metropolitan area network (MAN), a global area network (GAN), a storage area network (SAN), a virtual private network (VPN), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, a hierarchical topology network, or any other type of computer network that is known in the art.

A client, such as clients 100, 110, and 120, can connect to application router 140 over a sequential, stream-oriented protocol. The sequential, stream-oriented protocol can be a protocol carried by a transmission control protocol (TCP), such as HTTP, Extensible Messaging and Presence Protocol (XMPP), Simple Mail Transfer Protocol (SMTP), Domain Name System (DNS), Post Office Protocol (POP), File Transfer Protocol (FTP), Remote Procedure Call (RPC), Internet Message Access Protocol (IMAP), Lightweight Directory Access Protocol (LDAP), Unix-to-Unix Copy (UUCP), Network Time Protocol (NTP), Internet Relay Chat (IRC), SOCKS, Point-to-Point Protocol (PPP), Network File System (NFS), Subversion (SVN), Inter-Asterisk Protocol (IAX), Session Initiation Protocol (SIP), mySQL protocol, Oracle protocol, PostgreSQL protocol, X11, any chat protocol (such as MSN, Yahoo, and Facebook), or any other sequential, stream-oriented protocol known in the art.

Application router 140 is a software application or service, that runs on a server and is part of private network 130. According to an embodiment of the invention, application router 140 can authenticate a client that is outside of private network 130 and route a request to connect from the client to one of multiple services within private network 130 based on the authentication of the client, as will be discussed in more detail. Therefore, application router 140 can be considered a router for an application layer, rather than a physical layer. In an embodiment, application router 140 is run on a server that is part of private network 130, but is exposed to the outside of private network 130, so that clients outside of private network 130 can send connection requests to application router 140 over any sequential, stream-oriented protocol. In an embodiment, the server containing application router 140 can be exposed to the outside of private network by opening one or more ports of the server and allowing packets or messages to be received by the server containing application router 140 over a sequential, stream-oriented protocol. Furthermore, according to an embodiment, an exchange between a client and application router 140 occurs on a confidential channel, so that other clients do not become aware of the content of the exchange. A confidential channel, as understood by one of ordinary skill in the art, is a communication channel that is resistant to interception by a third party. Making a channel confidential can be accomplished in many different ways. As an example, a channel can be made confidential by encrypting the content, such as IP packets and messages, that are transmitted over the channel.

Private service servers 150 and 160 are servers that are within private network 130, but are not exposed to the outside of private network 130. This means that clients outside of private network 130 cannot send connections requests directly to private service services 150 and 160. Private service servers 150 and 160 can each have a service, or a class of services, which runs on the server. A service can receive a request over a protocol and provide a response over the protocol. For example, the service can receive an HTTP request over an HTTP protocol, and respond with a web page over the HTTP protocol. As another example, the service can receive a chat request over a chat protocol (such as MSN, Yahoo, and Facebook), and the service can initiate a chat window over the chat protocol in response to the chat request.

Figure 2:
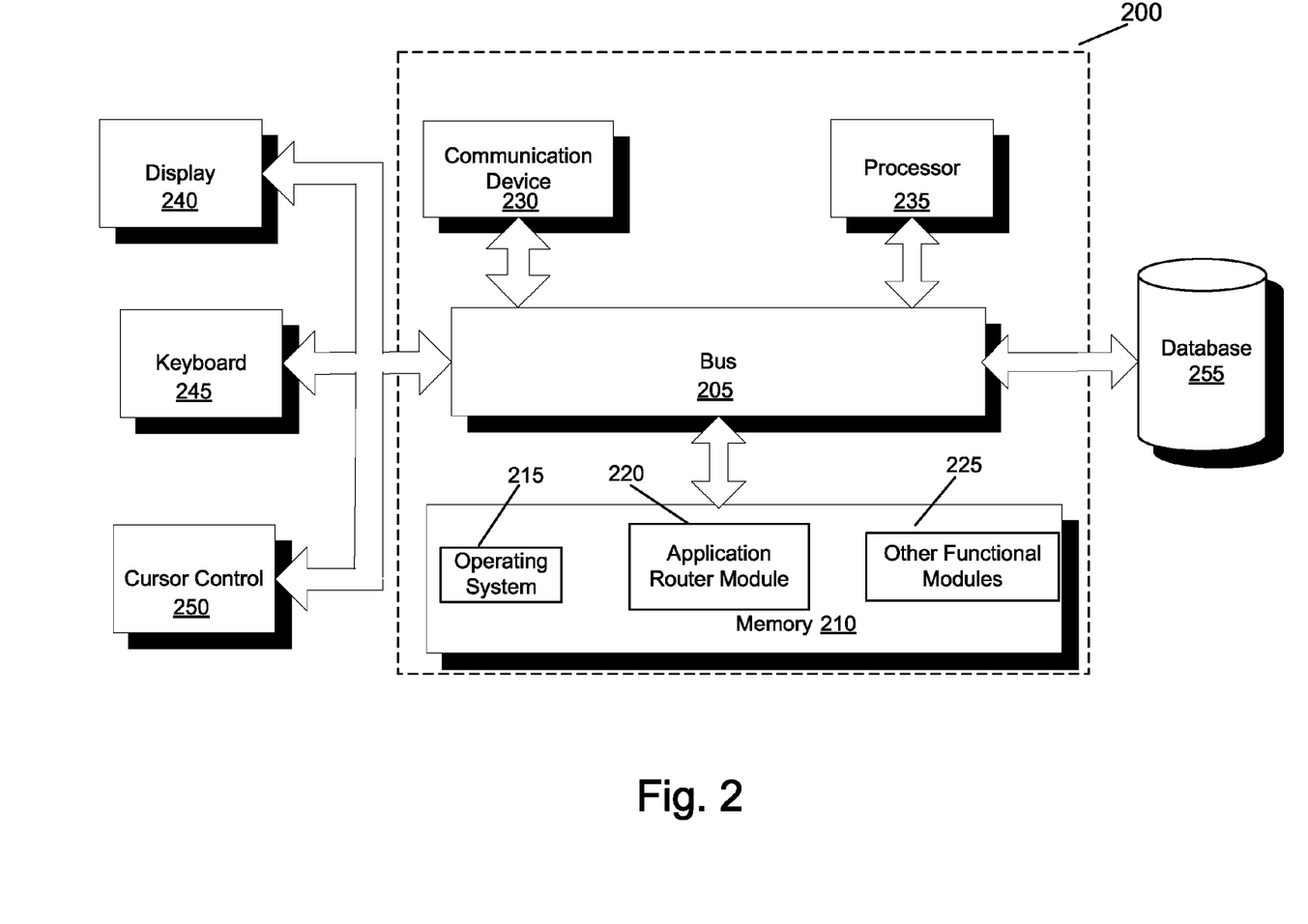
FIG. 2 illustrates a block diagram of an apparatus according to an embodiment of the invention.

FIG. 2 illustrates a block diagram of an apparatus according to an embodiment of the invention. Specifically, FIG. 2 illustrates apparatus 200. In one embodiment of the invention, apparatus 200 is an application router similar to application router 140 of FIG. 1. Apparatus 200 includes a bus 205 or other communications mechanism for communicating information between components of apparatus 200. Apparatus 200 also includes a processor 235, operatively coupled to bus 205, for processing information and executing instructions or operations. Processor 235 may be any type of general or specific purpose processor. Apparatus 200 further includes a memory 210 for storing information and instructions to be executed by processor 235. Memory 210 can be comprised of any combination of random access memory (RAM), read only memory (ROM), static storage such as a magnetic or optical disk, or any other type of machine or computer readable medium. Apparatus 200 further includes a communication device 230, such as a network interface card or other communications interface, to provide access to a network. As a result, a user may interface with apparatus 200 directly, or remotely through a network or any other method.

A computer readable medium may be any available medium that can be accessed by processor 235. Computer readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium known in the art.

Processor 235 can also be operatively coupled via bus 205 to a display 240, such as a Liquid Crystal Display (LCD). Display 240 can display information to the user. A keyboard 245 and a cursor control device 250, such as a computer mouse, can also be operatively coupled to bus 205 to enable the user to interface with apparatus 200.

According to one embodiment, memory 210 can store software modules that may provide functionality when executed by processor 235. The modules can include an operating system 215, an application router module 220, as well as other functional modules 225. Operating system 215 can provide an operating system functionality for apparatus 200. Application router module 220 can provide functionality for authenticating a client, and routing a request to connect from the client to one of multiple services based on the authentication of the client, as will be described in more detail below. Apparatus 200 can also be part of a larger system. Thus, apparatus 200 can include one or more additional functional modules 225 to include additional functionality for the system.

Processor 235 can also be operatively coupled via bus 205 to a database 255. Database 255 can store data in an integrated collection of logically-related records or files. Database 255 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
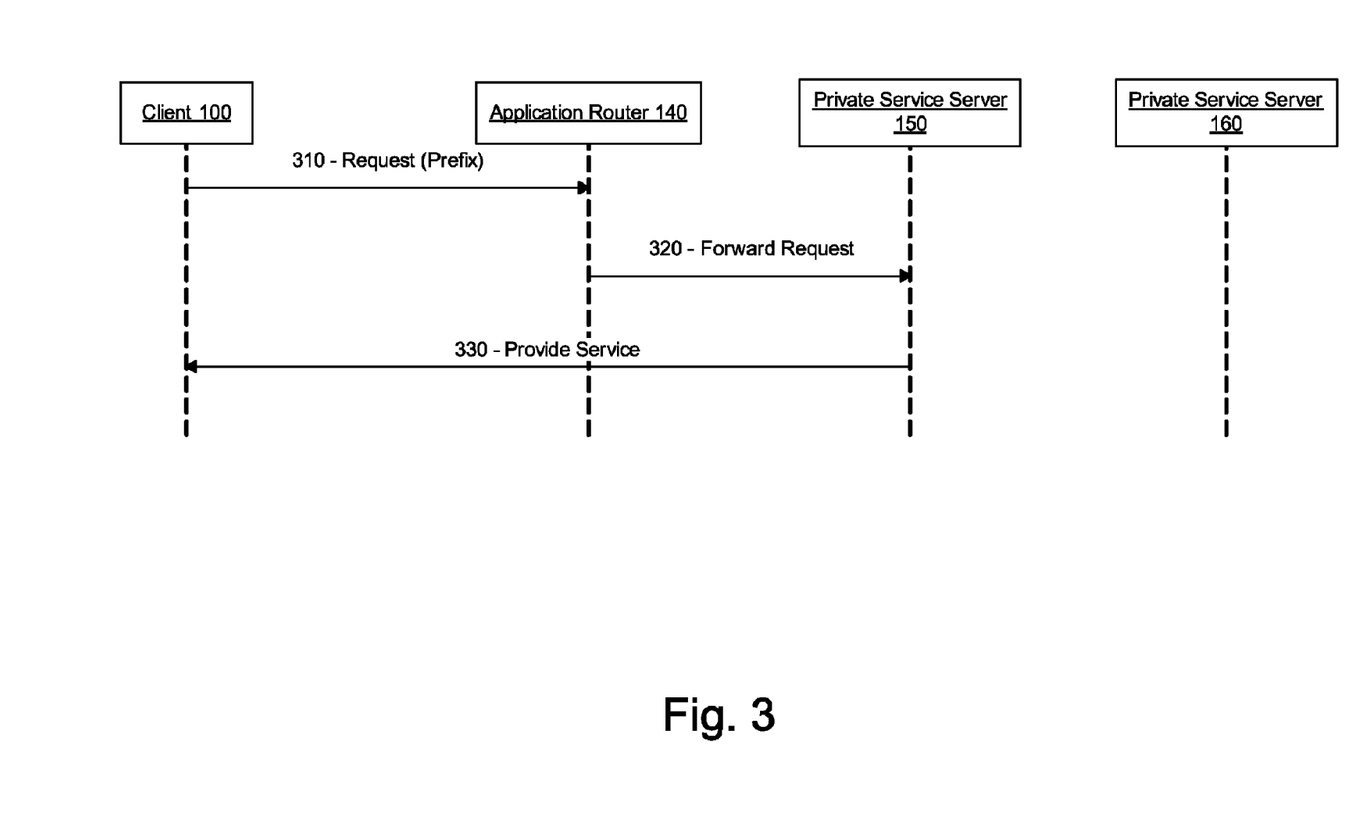
FIG. 3 illustrates a signaling flow according to an embodiment of the invention.

FIG. 3 illustrates a signaling flow according to an embodiment of the invention. In this embodiment, a connection request includes a prefix. In FIG. 3, client 100 of FIG. 1 is illustrated as an example of a client that can connect to application router 140 of FIG. 1. However, client 100 is merely an example client, and, as previously described, a client can be any computer system or software application that accesses a service on a remote computer system.

At step 310, client 100 sends a connection request to application router 140. In an embodiment, the request can be a request for a data stream according to a protocol. According to the embodiment, the request includes a prefix. The prefix is an example of an authentication token that both client 100 and application router 140 can recognize as entitling client 100 to access a specific service or a specific class of services. The prefix can be any structure of a fixed-length that is attached to the request. For example, the prefix can be an XML packet, a binary data stream, a text string, or a set of data that is known both to client 100 and application router 140.

In an embodiment, client 100 can request and receive the prefix from application router 140 at some point before client 100 sends a connection request at step 310. In another embodiment, the prefix is stored locally at client 100. In another embodiment, the prefix is stored at some other location and is requested by client 100 before client 100 sends a connection request to application router 140 step 310. In an embodiment of the invention, the prefix can be stored in a configuration file, a database, a lookup table, or can be embedded within a service.

After application router 140 receives the connection request from client 100, application router 140 evaluates whether the connection request includes the prefix. In this embodiment, the connection request does include the prefix, so application router 140 determines that client 100 can access the requested service. In this embodiment, client 100 requests to connect to the service run at private service server 150. Thus, at step 320, application router 140 forwards the connection request to private service server 150. According to the embodiment, forwarding the connection request to private service server 150 also includes creating a connection between client 100 and private service server 150, so that client 100 and private service server 150 can transfer data. In the embodiment, client 100 can be unaware of the forwarding, and it can appear to client 100 that it is directly communicating with private service server 150.

In an embodiment of the invention, private service server 150 is a private service server running a covert service. In this embodiment, the covert service running on private service server 150 is only exposed to properly authenticated clients. If a client does not include a prefix with its connection request, then the client is not authenticated, and the covert service is not exposed to that client. Thus, the covert service cannot be discovered by an intruder through means such as eavesdropping on an interaction with that service. In another embodiment of the invention, private service server 150 is a private service server running a class of covert services. The class of covert services is only exposed to authenticated clients. Thus, an authenticated client can access any service of the class of covert services running on private service server 150.

At step 330, private service server 150 sends a message to client 100 which initiates a provision of a service running on private service server 150 to client 100. In an embodiment of the invention, the provision of the service can include providing a web page to client 100. In another embodiment, the provision of the service can include initiating a chat session between private service server 150 and client 100. According to an embodiment, the provision of the service can include transferring data between private service server 150 and client 100. In an embodiment of the invention, the service is a covert service, and is exposed to client 100, whereas the covert service is not exposed to other unauthenticated clients. In another embodiment, the service is one of a class of covert services, where the class of covert services is exposed to client 100, and the class of covert services is not exposed to other unauthenticated clients.

According to the embodiment, the connection request sent by client 100, the forwarding of the connection request by application router 140, and the sending of the message by private service server 150 to client 100 can each occur over a confidential channel. Because each exchange occurs over a confidential channel, other clients cannot observe the prefix or observe the interaction with private service server 150, and cannot become aware of private service server 150. In one embodiment of the invention, the confidential channel is made confidential by encrypting the connection request sent by client 100, encrypting the forwarded connection request sent by application router 140, and encrypting the message sent by private service server 150 to client 100.

Figure 4:
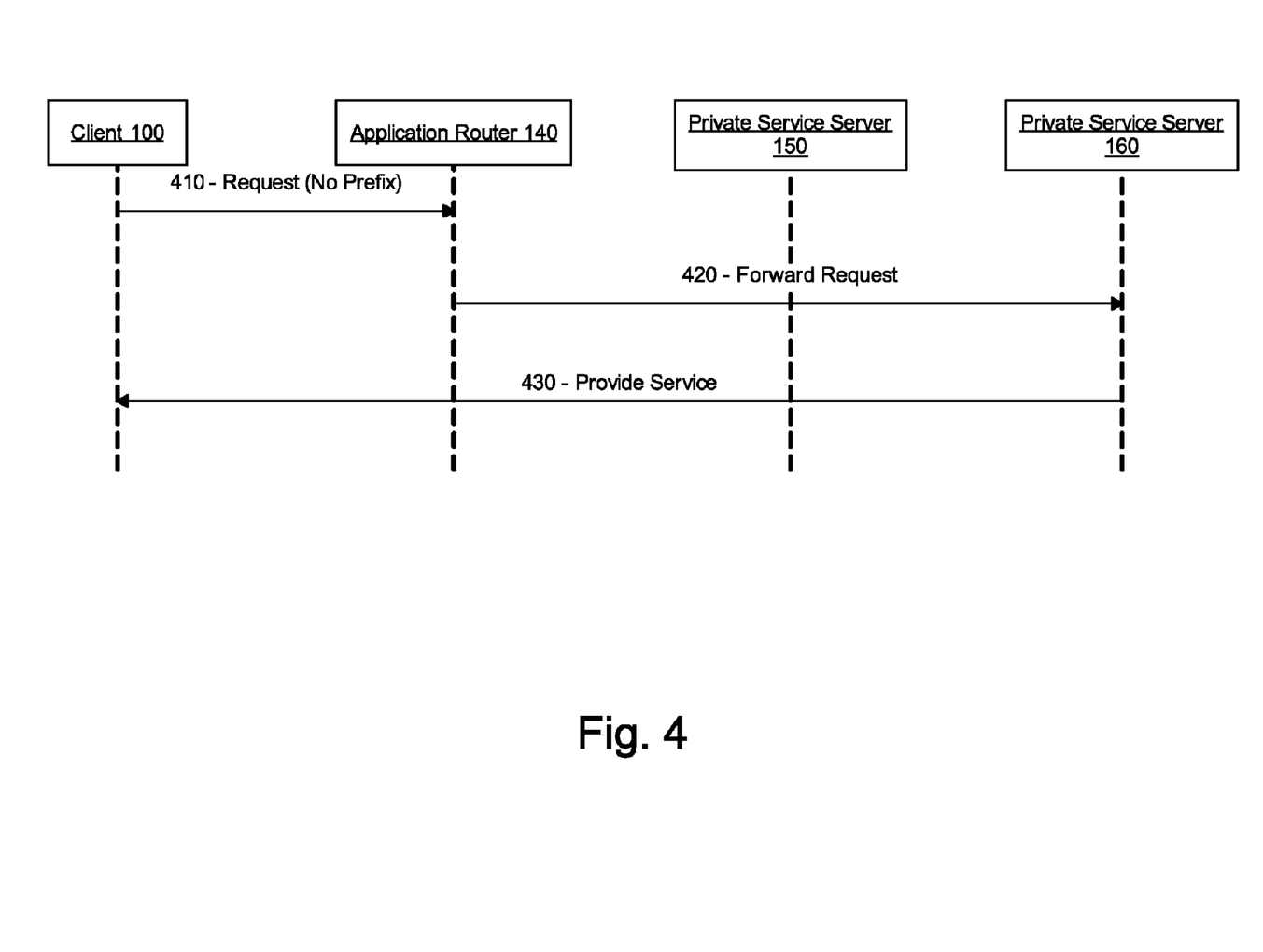
FIG. 4 illustrates another signaling flow according to an embodiment of the invention.

FIG. 4 illustrates another signaling flow according to an embodiment of the invention. In this embodiment, a connection request does not include a prefix. In FIG. 4, client 100 of FIG. 1 is illustrated as an example of a client that can connect to application router 140 of FIG. 1. However, client 100 is merely an example client, and, as previously described, a client can be any computer system or software application that accesses a service on a remote computer system.

While in the illustrated embodiment, a connection request does not include a prefix, in an alternate embodiment, the connection request can include a prefix, but the prefix is not the correct prefix that identifies that a client can access a requested service. In this alternate embodiment, the signaling flow is the same as in the embodiment where the connection request does not include a prefix, as will be described in more detail.

At step 410, client 100 sends a connection request to application router 140. In an embodiment, the request can be a request for a data stream according to a protocol. According to this embodiment, unlike the embodiment illustrated in FIG. 3, the request does not include a prefix.

After application router 140 receives the connection request from client 100, application router 140 evaluates whether the connection request includes the prefix. In this embodiment, the connection request does not include the prefix, so application router 140 determines that client 100 cannot access the requested service, and instead, can access an alternate service or an alternate class of services. In this embodiment, client 100 requests to connect to the service run at private service server 150. Thus, at step 420, application router 140 forwards the connection request to private service server 160 rather than private service server 150. According to the embodiment, forwarding the connection request to private service server 160 also includes creating a connection between client 100 and private service server 160, so that client 100 and private service server 160 can transfer data. In the embodiment, client 100 can be unaware of the forwarding, and it can appear to client 100 that it is directly communicating with private service server 160.

In an embodiment of the invention, private service server 160 is a private service server running a public service that is an alternate to a covert service running on private service server 150. In this embodiment, the alternate service running on private service server 160 is exposed to any client that can access private network 130, regardless of whether the client is properly authenticated using the prefix. Thus, even if an intruder eavesdrops on an unsecured interaction with application router 140, the intruder can only discover the alternate service running on private service server 160, and cannot discover the covert service running on private service server 150. In another embodiment of the invention, private service server 160 is a private service server running a class of alternate services. The class of alternative services is exposed to any client that can access private network 130, regardless of whether the client is properly authenticated using the prefix.

At step 430, private service server 160 sends a message to client 100 which initiates a provision of a service running on private service server 160 to client 100. In an embodiment of the invention, the provision of the service can include providing a web page to client 100. In another embodiment, the provision of the service can include initiating a chat session between private service server 160 and client 100. According to an embodiment, the provision of the service can include transferring data between private service server 160 and client 100. In an embodiment of the invention, the service is an alternative service to a covert service, and is a service that can be exposed to any client that has access to private network 130, regardless of whether the client is authenticated by application router 140 based on the authentication or lack thereof. This is contrast to the covert service that runs on private service server 150, which is only exposed to clients that are authenticated by application router 140 based on the authentication. In another embodiment, the service is one of a class of alternate services, where the class of alternate services can be exposed to any client that has access to private network 130, regardless of whether the client is authenticated by application router 140 based on the authentication or lack thereof.

Figure 5:
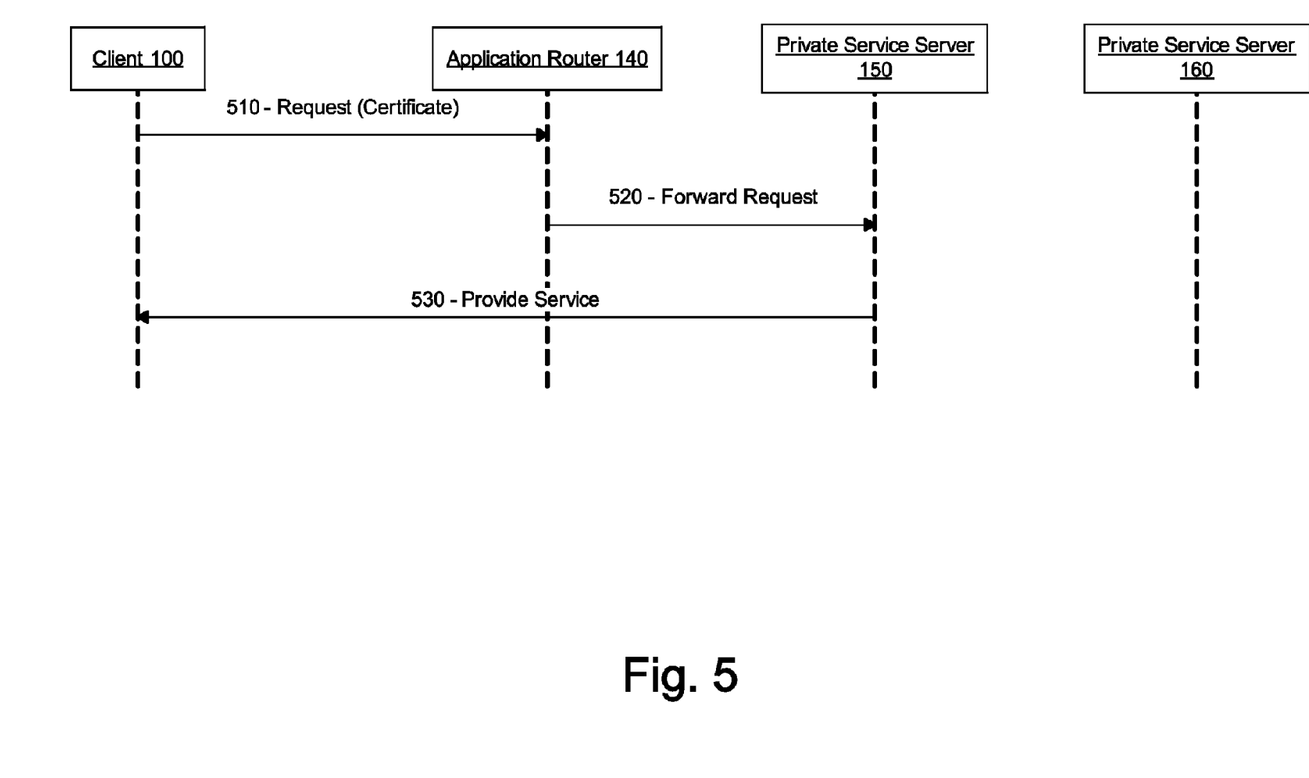
FIG. 5 illustrates another signaling flow according to an embodiment of the invention.

FIG. 5 illustrates another signaling flow according to an embodiment of the invention. In this embodiment, client 100 is authenticated over a cryptographic protocol, such as SSL/TLS, IPSec, and OpenVPN. In FIG. 5, client 100 of FIG. 1 is illustrated as an example of a client that can connect to application router 140 of FIG. 1. However, client 100 is merely an example client, and, as previously described, a client can be any computer system or software application that accesses a service on a remote computer system.

At step 510, client 100 sends a connection request to application router 140. In an embodiment, the request can be a request for a data stream according to a protocol. According to the embodiment, the request includes a certificate. A certificate is another example of an authentication token that both client 100 and application router 140 can recognize as entitling client 100 to access a specific service or a specific class of services. In cryptographic protocols, such as SSL/TLS, IPSec, and OpenVPN, a certificate (also identified as a public key certificate, a digital certificate, and an identity certificate) can be an electronic document which uses a digital signature to bind together a public key with an identity. The identity can include information such as a client's name, organization, or address. The certificate can be used to verify that a public key belongs to the client, and thus, authenticate the client that provides the certificate.

In an alternate embodiment, not shown in FIG. 5, client 100 can hold off on sending the certificate until application router 140 requests the certificate, and instead merely sends a connection request. In this embodiment, once application router 140 requests the certificate, client 100 sends the certificate to application router 140 as described above.

After application router 140 receives the connection request, application router 140 determines whether the connection request includes a certificate and if so, authenticates the certificate. In this embodiment, the connection request does include the certificate, and the certificate is an valid certificate, so application router 140 determines that client 100 can access the requested service. In this embodiment, client 100 requests to connect to the service run at private service server 150. Thus, at step 520, application router 140 forwards the connection request to private service server 150.

According to the embodiment, forwarding the connection request to private service server 150 also includes creating a connection between client 100 and private service server 150, so that client 100 and private service server 150 can transfer data. In the embodiment, client 100 can be unaware of the forwarding, and it can appear to client 100 that it is directly communicating with private service server 150.

In an embodiment of the invention, private service server 150 is a private service server running a covert service. In this embodiment, the covert service running on private service server 150 is only exposed to properly authenticated clients. If a client does not include a certificate with its connection request, then the client is not authenticated, and the covert service is not exposed to that client. Thus, the covert service cannot be discovered by an intruder through means such as eavesdropping on an interaction with that service. In another embodiment of the invention, private service server 150 is a private service server running a class of covert services. The class of covert services is only exposed to authenticated clients. Thus, an authenticated client can access any service of the class of covert services running on private service server 150.

At step 530, private service server 150 sends a message to client 100 which initiates a provision of a service running on private service server 150 to client 100. In an embodiment of the invention, the provision of the service can include providing a web page to client 100. In another embodiment, the provision of the service can include initiating a chat session between private service server 150 and client 100. According to an embodiment, the provision of the service can include transferring data between private service server 150 and client 100. In an embodiment of the invention, the service is a covert service, and is exposed to client 100, whereas the covert service is not exposed to other unauthenticated clients. In another embodiment, the service is one of a class of covert services, where the class of covert services is exposed to client 100, and the class of covert services is not exposed to other unauthenticated clients.

According to the embodiment, the connection request sent by client 100, the forwarding of the connection request by application router 140, and the sending of the message by private service server 150 to client 100 can each occur over a confidential channel. Because each exchange occurs over a confidential channel, other clients cannot observe the certificate or observe the interaction with private service server 150, and cannot become aware of private service server 150. In one embodiment of the invention, the confidential channel is made confidential by encrypting the connection request sent by client 100, encrypting the forwarded connection request sent by application router 140, and encrypting the message sent by private service server 150 to client 100.

Figure 6:
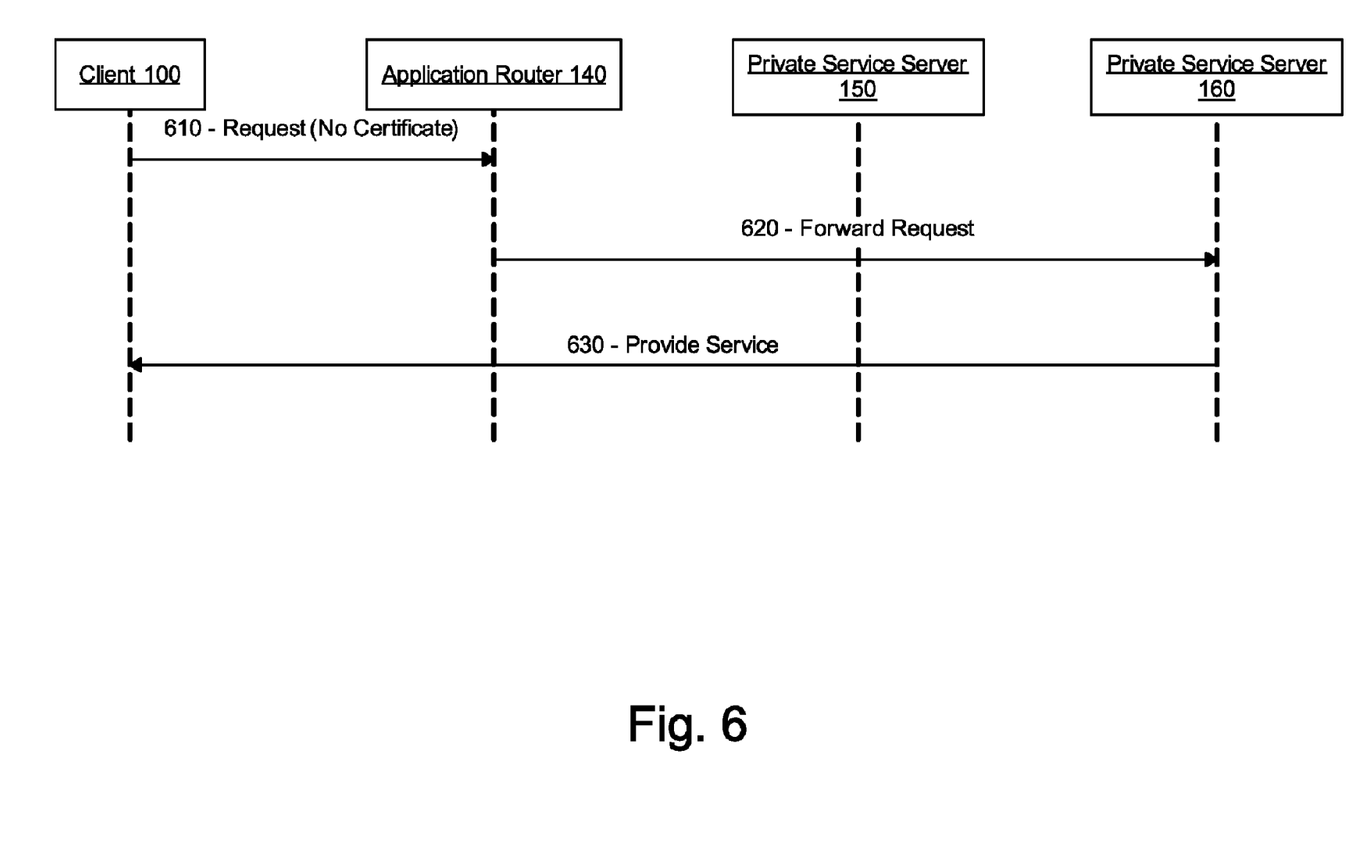
FIG. 6 illustrates another signaling flow according to an embodiment of the invention.

FIG. 6 illustrates another signaling flow according to an embodiment of the invention. In this embodiment, similar to the illustrated embodiment in FIG. 5, client 100 is authenticated over a cryptographic protocol, such as SSL/TLS, IPSec, and OpenVPN. However, unlike the illustrated embodiment in FIG. 5, the connection request sent by client 100 does not include a certificate. In FIG. 6, client 100 of FIG. 1 is illustrated as an example of a client that can connect to application router 140 of FIG. 1. However, client 100 is merely an example client, and, as previously described, a client can be any computer system or software application that accesses a service on a remote computer system.

While in the illustrated embodiment, a connection request does not include a certificate, in an alternate embodiment, the connection request can include a certificate, but the certificate is not the correct certificate that identifies that a client can access a requested service. In this alternate embodiment, the signaling flow is the same as in the embodiment where the connection request does not include a certificate, as will be described in more detail.

At step 610, client 100 sends a connection request to application router 140. In an embodiment, the request can be a request for a data stream according to a protocol. In this embodiment, the connection request does not include a certificate.

After application router 140 receives the connection request, application router 140 determines whether the connection request includes the certificate. In this embodiment, the connection request does not include the certificate, so application router 140 determines that client 100 cannot access the requested service, and instead, can access an alternate service. In this embodiment, client 100 requests to connect to the service run at private service server 150. Thus, at step 620, application router 140 forwards the connection request to private service server 160 rather than private service server 150. According to the embodiment, forwarding the connection request to private service server 160 also includes creating a connection between client 100 and private service server 160, so that client 100 and private service server 160 can transfer data. In the embodiment, client 100 can be unaware of the forwarding, and it can appear to client 100 that it is directly communicating with private service server 150.

In an embodiment of the invention, private service server 160 is a private service server running a public service that is an alternate to a covert service running on private service server 150. In this embodiment, the alternate service running on private service server 160 is exposed to any client that can access private network 130, regardless of whether the client is properly authenticated using the certificate. Thus, even if an intruder eavesdrops on an interaction with application router 140, the intruder can only discover the alternate service running on private service server 160, and cannot discover the covert service running on private service server 150. In another embodiment of the invention, private service server 160 is a private service server running a class of alternate services. The class of alternative services is exposed to any client that can access private network 130, regardless of whether the client is properly authenticated using the certificate.

At step 630, private service server 160 sends a message to client 100 which initiates a provision of a service running on private service server 160 to client 100. In an embodiment of the invention, the provision of the service can include providing a web page to client 100. In another embodiment, the provision of the service can include initiating a chat session between private service server 160 and client 100. According to an embodiment, the provision of the service can include transferring data between private service server 160 and client 100. In an embodiment of the invention, the service is an alternative service to a covert service, and is a service that can be exposed to any client that has access to private network 130, regardless of whether the client is authenticated by application router 140 based on the authentication or lack thereof. This is contrast to the covert service that runs on private service server 150, which is only exposed to clients that are authenticated by application router 140 based on the authentication. In another embodiment, the service is one of a class of alternate services, where the class of alternate services can be exposed to any client that has access to private network 130, regardless of whether the client authenticated by application router 140 based on the authentication or lack thereof.

Figure 7:
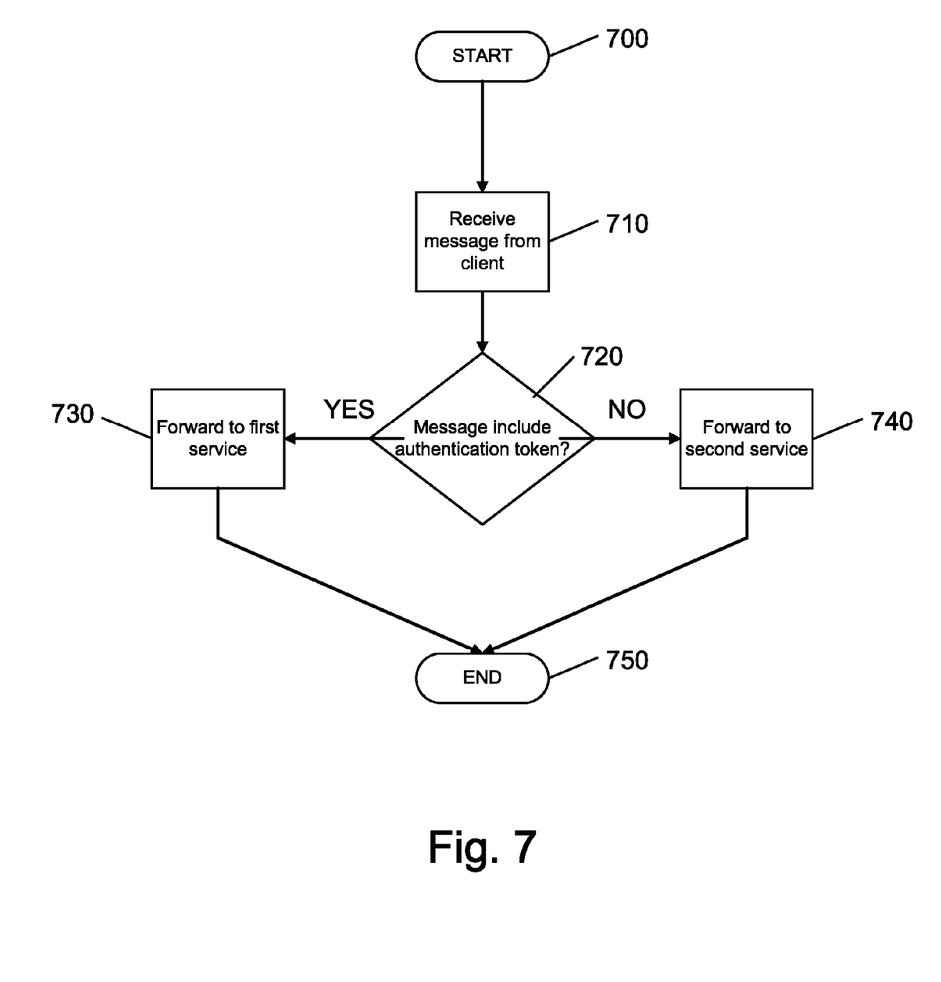
FIG. 7 illustrates a flow diagram according to an embodiment of the invention.

FIG. 7 illustrates a flow diagram according to an embodiment of the invention. The method starts at step 700, and at step 710, a message is received from a client. In an embodiment of the invention, the message is a connection request. At step 720, it is determined whether the message includes an authentication token. An authentication token can be any structure that a client and an application router can both recognize as entitling the client to access a specific service or a specific class of services. For example, the authentication token can be a prefix or a certificate. If the authentication token is a prefix, the prefix can be any structure of a fixed-length that is attached to the request. For example, the prefix can be an XML packet, a binary data stream, a text string, or a set of data. If the authentication token is a certificate, the certificate can be an electronic document which uses a digital signature to bind together a public key with an identity.

If the message includes the authentication token, the message is forwarded to a first service at step 730. In an embodiment of the invention, the first service is a covert service only exposed to clients which provide the authentication token, and thus, are properly authenticated to access the covert service. If the message does not include the authentication token, the message is forwarded to a second service at step 740. In an embodiment of the invention, the second service is a public service that is exposed to any client, and is an alternate to the covert service. The method then completes at step 750. According to the embodiment, the receiving the message from the client, and the forwarding the message to the first service occur over a confidential channel. The channel can be made confidential by encrypting the message.

Figure 8:
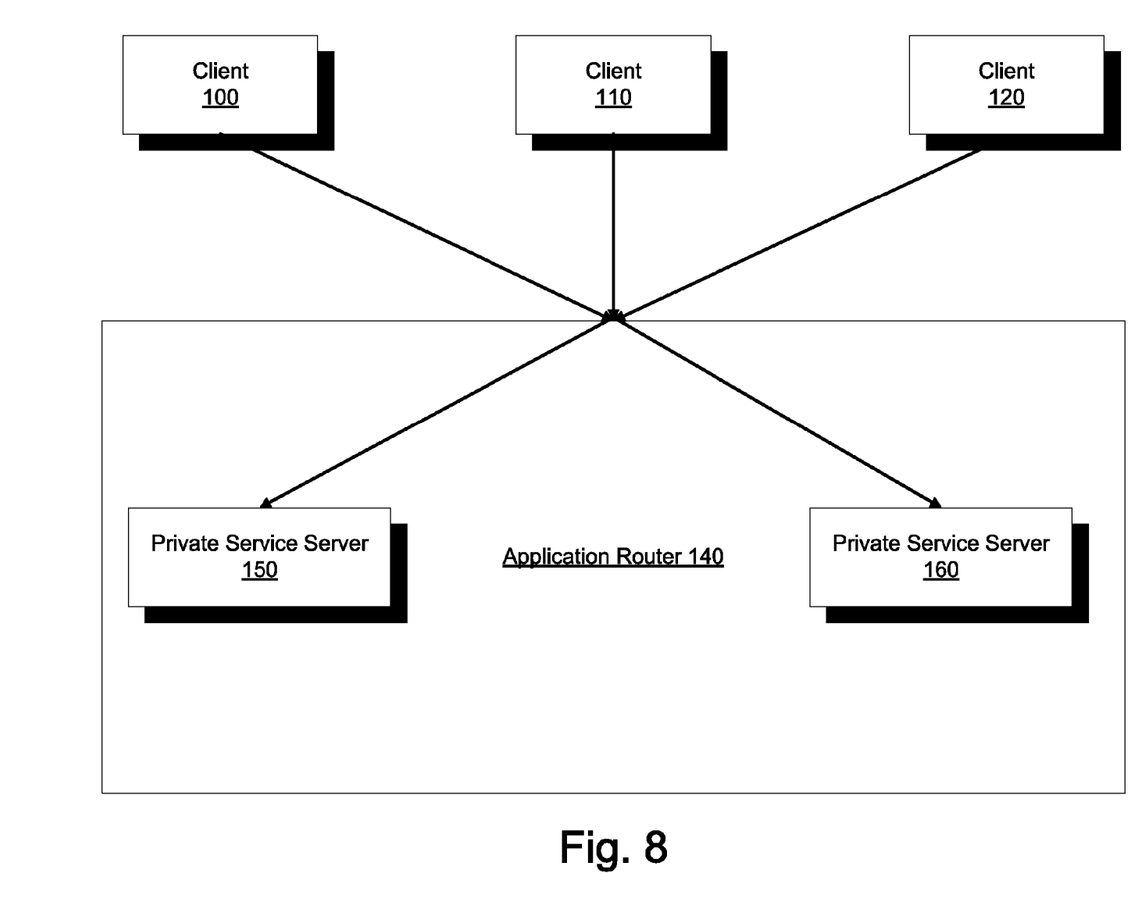
FIG. 8 illustrates an alternate embodiment of a system according to the present invention.

FIG. 8 illustrates an alternate embodiment of a system according to the present invention. The illustrated embodiment of FIG. 8 is an alternate embodiment of the illustrated embodiment of FIG. 1. In the illustrated embodiment of FIG. 8, application router 140 is not within a private network, and instead is part of a network that is directly connected to the Internet. According to the embodiment, private service servers 150 and 160 are located with application router 140. However, in this embodiment, private service servers 150 and 160 are each configured to only be accessible by application router 140, and cannot be detected by clients 100, 110, and 120. Thus, while clients 100, 110, and 120 can connect to application router 140, and can connect to any other resource of application router 140 directly, clients 100, 110, and 120 cannot send connections requests directly to private service services 150 and 160. Instead, clients 100, 110, and 120 must send their connection request to application router 140 and be authenticated by application router 140 depending on which service they wish to access, as previously described.

The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
receiving, at an application router, a message from a client;
forwarding, at the application router, the message to a first service when the message comprises an authentication token, wherein the authentication token indicates that the client can access the first service;
creating, at the application router, a connection between the client and the first service when the application router forwards the message to the first service, wherein the first service sends a response message to the client over the connection; and
forwarding, at the application router, the message to a second service when the message excludes the authentication token,
wherein the receiving the message from the client, the forwarding the message to the first service, and the sending the response message by the first service to the client occur over a confidential channel, wherein the confidential channel is made confidential by encrypting the message received from the client, the message forwarded to the first service, and the response message sent by the first service to the client.

2. The method of claim 1,
wherein the first service is one of a class of first services,
wherein the second service is one of a class of second services, and
wherein the authentication token indicates that the client can access the class of first services.

3. The method of claim 1, wherein the authentication token comprises a prefix, wherein the prefix is a structure of a fixed length that is attached to the message.

4. The method of claim 3, wherein the prefix comprises an extensible markup language packet, a binary data stream, a text string, or a set of data.

5. The method of claim 1, wherein the authentication token comprises a certificate.

6. The method of claim 5, wherein the certificate comprises an electronic document which uses a digital signature to bind together a public key with an identity.

7. The method of claim 1, wherein the message comprises a connection request.

8. The method of claim 1, wherein the receiving of the message from the client further comprises receiving the message over a sequential, stream-oriented protocol.

9. The method of claim 1, wherein the client requests and receives the authentication token before the client sends a message.

10. The method of claim 9, wherein the authentication token is stored in a configuration file, a database, a lookup table, or a service.

11. The method of claim 1, wherein the authentication token is stored locally at the client.

12. The method of claim 1,
wherein the first service is a covert service that is only exposed to a client that includes an authentication token within the message, and wherein the second service is an alternate service that is exposed to any client regardless of whether the client includes an authentication token within the message.

13. The method of claim 1, further comprising:
requesting that the client provide the authentication token;
receiving the authentication token from the client in response to the request.

14. An apparatus, comprising:
a memory configured to store instructions; and
a processor configured to execute the instructions stored on the memory,
wherein the processor is further configured, when executing the instructions stored on the memory, to,
receive a message from a client,
forward the message to a first service when the message comprises an authentication token, wherein the authentication token indicates that the client can access the first service,
create a connection between the client and the first service when the application router forwards the message to the first service, wherein the first service sends a response message to the client over the connection, and
forward the message to a second service when the message excludes the authentication token, and
wherein the processor is further configured, when executing the instructions stored on the memory, to receive a message from the client, to forward the message to the first service, and to facilitate the sending of the response message by the first service to the client over a confidential channel, wherein the confidential channel is made confidential by encrypting the message received from the client, the message forwarded to the first service, and the response message sent by the first service to the client.

15. The apparatus of claim 14,
wherein the first service is one of a class of first services,
wherein the second service is one of a class of second services, and
wherein the prefix indicates that the client can access the class of first services.

16. The apparatus of claim 14,
wherein the first service is a covert service that is only exposed to a client that includes an authentication token within the message, and
wherein the second service is an alternate service that is exposed to any client regardless of whether the client includes an authentication token within the message.

17. The apparatus of claim 14, wherein the processor is further configured, when executing the instructions stored on the memory, to,
request that the client provide the authentication token, and
receive the authentication token from the client in response to the request.

18. A non-transitory computer readable medium having a computer program stored thereon that, when executed by a processor, causes the processor to implement a method, the method comprising:
receiving a message from a client;
forwarding the message to a first service when the message comprises an authentication token, wherein the authentication token indicates that the client can access the first service;
creating a connection between the client and the first service when the application router forwards the message to the first service, wherein the first service sends a response message to the client over the connection; and
forwarding the message to a second service when the message excludes the authentication token,
wherein the receiving the message from the client, the forwarding the message to the first service, and the sending the response message by the first service to the client occur over a confidential channel, wherein the confidential channel is made confidential by encrypting the message received from the client, the message forwarded to the first service, and the response message sent by the first service to the client.

19. The non-transitory computer readable medium of claim 18,
wherein the first service is one of a class of first services,
wherein the second service is one of a class of second services, and
wherein the authentication token indicates that the client can access the class of first services.

20. The non-transitory computer readable medium of claim 18,
wherein the first service is a covert service that is only exposed to a client which includes an authentication token within the message, and
wherein the second service is an alternate service that is exposed to any client regardless of whether the client includes an authentication token within the message.

21. The non-transitory computer readable medium of claim 18, the instructions further comprising:
requesting that the client provide the authentication token; and
receiving the authentication token from the client in response to the request.

* * * * *